United States Patent [19]

Miller et al.

[11] 4,281,733

[45] Aug. 4, 1981

[54] MOTOR TRUCK HOOD OPENING DAMPER RESTRAINT

[75] Inventors: James Miller; Walter E. Eifrid; Jay P. Hacker, all of Fort Wayne, Ind.

[73] Assignee: International Harvester Company, Chicago, Ill.

[21] Appl. No.: 76,109

[22] Filed: Sep. 17, 1979

[51] Int. Cl.³ .............................................. B62D 25/10
[52] U.S. Cl. ................. 180/69 C; 180/89.14; 188/269; 188/284; 296/76
[58] Field of Search ............... 180/69 C, 69 R, 89.14, 180/89.15; 296/76; 188/284, 269

[56] References Cited

U.S. PATENT DOCUMENTS

| 3,017,944 | 1/1962 | Norrie | 180/69 C |
| 3,157,240 | 11/1964 | Chew | 180/69 C |
| 3,232,368 | 2/1966 | Sullivan | 180/69 C |
| 3,419,099 | 12/1968 | Brumbaugh et al. | 180/69 C |
| 3,754,613 | 8/1973 | Stephens et al. | 180/69 C |

FOREIGN PATENT DOCUMENTS 2024884  12/1971  Fed. Rep. of Germany ............. 296/76

Primary Examiner—Joseph F. Peters, Jr.
Assistant Examiner—Milton L. Smith
Attorney, Agent, or Firm—Raymond E. Parks; Frederick J. Krubel; F. David AuBuchon

[57] ABSTRACT

A motor truck hood opening damper restraint in the form of a vertically mounted, hydraulic hood damper or dash pot which restricts the speed of travel of the hood past an overcenter position, cushions the hood at the stop at the open position and permits unrestricted speed of travel when closing the hood.

4 Claims, 2 Drawing Figures

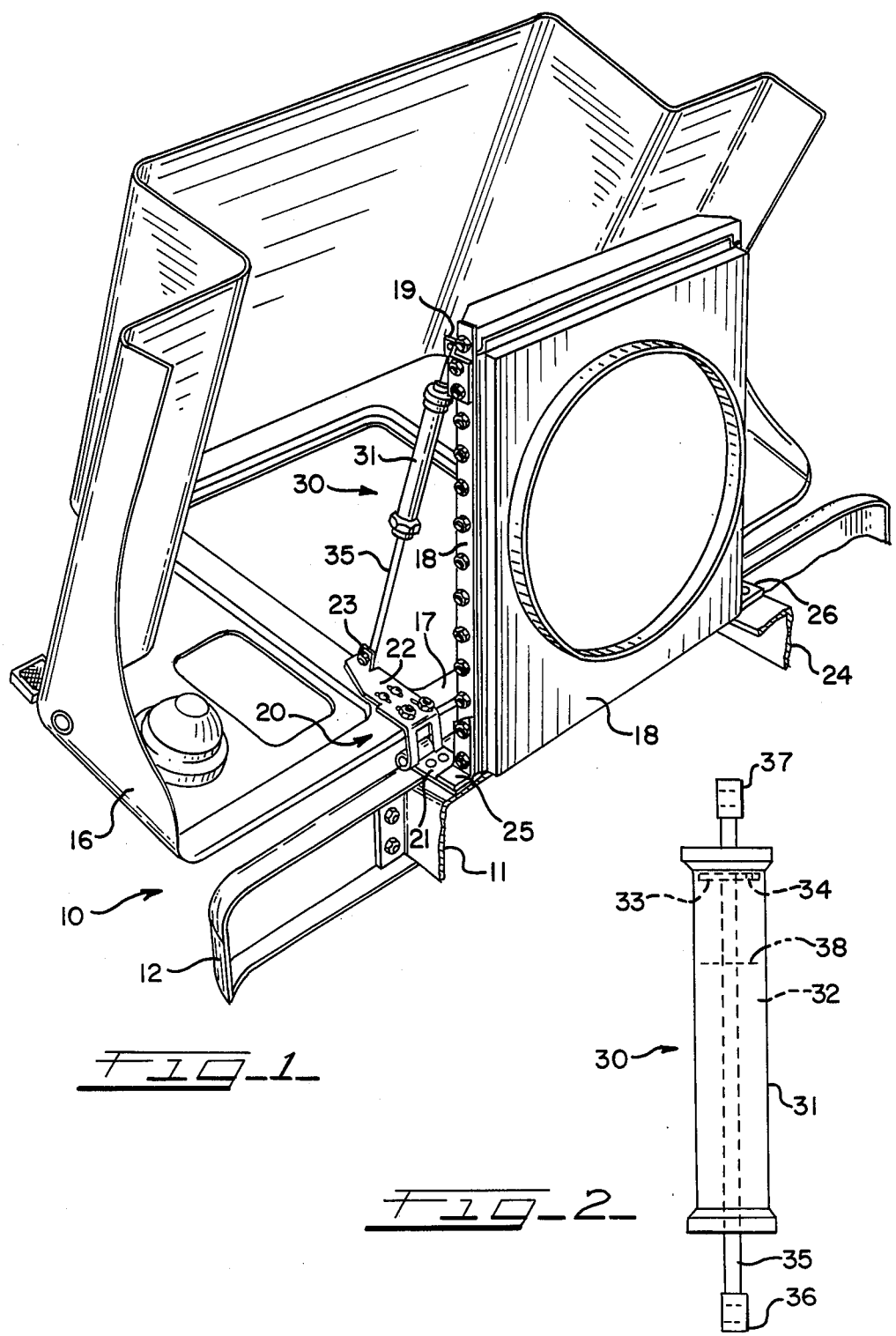

MOTOR TRUCK HOOD OPENING DAMPER RESTRAINT

This invention relates to motor truck hoods and in particular to a hood opening damper restraint and mounting means therefor.

Many motor trucks have tiltable engine compartment hoods which tilt fowardly and downwardly for servicing the engine compartment. If the hood is large and heavy, hydraulic power assist piston and cylinder means, such as shown in U.S. Pat. No. 3,419,099—Brumbaugh et al—Dec. 31, 1968, may be provided to control the speed of travel coupled with a spring cushioning means to absorb the shock of the stop at the fully opened position of the hood; or if the hood is relatively light, such as shown in U.S. Pat. No. 3,017,944—Norrie—Jan. 23, 1962, and in U.S. Pat. No. 3,232,368—Sullivan—Feb. 1, 1968, a coiled or straight cable may be provided, as a stop, coupled with gooseneck or coil spring biased hinges which act as shock absorbers at the stop.

In our invention, we have eliminated the cable stop, and special gooseneck and coil spring biased types of hinges with a hydraulic damping device or dash pot vertically mounted at the cylinder end to the top of an upright beam supporting a motor truck heat exchanger, and the depending piston end to a swingable hinge half connected at the front bottom of the motor truck hood.

The hydraulic damping device or dash pot is mounted in the vertical position when the hood is closed and is partially filled with hydraulic fluid to a predetermined level where the piston, which is provided with a hydraulic fluid metering orifice, sinks into the hydraulic fluid at the overcenter tilted position of the hood, so that there is unrestricted speed of travel in opening the hood up to the overcenter tilted position, with respect to the axis of the hinges, and restricted speed of travel thereafter limiting the speed of travel to the fully opened position. The metering orifice in the piston is such that it permits unrestricted speed of travel when closing the hood.

With reference to the figures of the drawings:

FIG. 1 shows a motor truck hood in the opened position in combination with a hood opening damper restraint means; and FIG. 2 is a front view of the hood opening damper means shown in FIG. 1.

The front end of a motor truck 10 is partially shown in FIG. 1, having a pair of supporting horizontal beams 11 and 24 carrying a front fender 12 and the stationary parts 21, one of which is shown, of two hood hinge assemblies 20. The swingable or moveable parts 22, one of which is shown, of the two hinge assemblies 20, are mounted to the front lower inside portion 17 of the hood 16. A heat exchanger or radiator 18 is mounted between a pair of upright beams 18, only the left one of which is shown, which are connected to the horizontal beam 11 and 24 by braces 25 and 26.

A hood opening damper restraint or hydraulic dampening means 30 is vertically mounted to the top of each upright beam 18 and to each swingable hinge part 22. As shown in FIG. 2, the hydraulic dampening means 30 comprises a cylinder 31 partially filled with hydraulic fluid 32, a piston 33 having a metering orifice means 34, and a piston rod 35. On the end of each swingable hinge part 22, there is a bracket means 23, which projects rearwardly, and to which is pivotally mounted, the eye 36 of the depending piston rod 35. A forwardly projecting bracket means 19 is mounted to each of the upright beams 18, pivotally mounting the eye 37, on the cylinder end thereto.

The cylinder 33 is partially filled with hydraulic fluid 32, to a predetermined level 38, where there is unrestricted speed of travel, when opening the hood 16 up to the overcenter tilted position, at which position, the rod side of each piston 33 is at the top of the hydraulic fluid level 38 and begins sink therein. The metering orifice means 34, in each piston 33, meters the hydraulic fluid from the rod side through the body of the piston 33 to the piston side thereby restricting the speed of travel of the hood 16 to the fully opened position shown in FIG. 1. In the fully opened position of the hood 16, the hood opening restraint means 30 are tilted forwardly and downwardly at an oblique angle with respect to the axis of the cylinder eye connection 37. When the hood 16 is tilted back to the closed position, the metering means 34 in each piston 33 opens unrestricted fluid communication between the piston and rod sides so that there is unrestricted speed of travel from the fully opened to the fully closed positions.

What is claimed is:

1. A motor truck hood opening damper restraint, comprising:
    a motor truck frame;
    a motor truck hood;
    a hood hinge means having a stationary part mounted on the frame and a swingable part swingable about a hinge axis mounted to a lower forward inside portion of the hood for tilting the hood forwardly and downwardly from a closed position to an open position;
    an upright beam means having a lower end fixed to the frame; and
    a hydraulic dampening means having a cylinder pivotally mounted at one end to an upper end of the upright beams means and a piston slidably mounted in the cylinder and having a piston rod extending axially outwardly from a second end of the cylinder and pivotally connected to the swingable part of the hinge means and swingable therewith, the cylinder and piston rod extending substantailly vertically in the closed position of the hood, the cylinder partially filled to a predetermined level with a hydraulic fluid and the piston rod holding the piston above the predetermined level of hydraulic fluid in the closed position of the hood, the partially filled cylinder permitting unrestricted speed of travel of the hood up to an overcenter balance point of the hood with respect to the hinge axis at which point the piston rod swinging with the swingable part of the hinge means pulling the piston downwardly into the hydraulic fluid at the predetermined level and restricting the speed of travel of the hood forwardly past the overcenter balance point to the fully opened position.

2. A motor truck hood opening damper restraint, according to claim 1, wherein:
    the piston having hydraulic fluid metering means therein for restricting fluid flow through the piston when pulled by the piston rod through the hydraulic fluid forwardly past the overcenter balance point of the hood and for permitting unrestricted flow of hydraulic fluid through the piston when pushed toward the one end of the cylinder by the piston rod swinging with the swingable part of the hinge means in a reverse direction during closing of the hood thereby permitting unrestricted speed of travel of the hood to the closed position.

3. A motor truck hood opening damper restraint, according to claim 2, wherein:

the swingable part of the hinge means includes a bracket means projecting rearwardly from the hood when viewed in the closed position thereof for pivotally connecting a piston rod eye end on the piston rod thereto, and the upper end of the upright beam means includes a forwardly projecting bracket means for pivotally connecting a cylinder eye end on the one end of the cylinder thereto.

4. A motor truck hood opening damper restraint, accordng to claim 3, further including a heat exchanger connected to the upright beam means and the forwardly projecting bracket means extending forwardly of the heat exchanger.

* * * * *